United States Patent
Goto

(10) Patent No.: US 8,514,468 B2
(45) Date of Patent: Aug. 20, 2013

(54) IMAGE FORMING APPARATUS

(75) Inventor: Keigo Goto, Yatomi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 232 days.

(21) Appl. No.: 13/004,114

(22) Filed: Jan. 11, 2011

(65) Prior Publication Data

US 2011/0176187 A1 Jul. 21, 2011

(30) Foreign Application Priority Data

Jan. 19, 2010 (JP) ................. 2010-008807

(51) Int. Cl.
| | |
|---|---|
| H04N 1/04 | (2006.01) |
| G03F 3/08 | (2006.01) |
| G06F 3/12 | (2006.01) |
| G06K 1/00 | (2006.01) |
| B41J 29/38 | (2006.01) |
| B41J 2/385 | (2006.01) |
| B41J 2/455 | (2006.01) |
| G03G 15/00 | (2006.01) |
| B65H 1/18 | (2006.01) |

(52) U.S. Cl.
USPC ........... 358/498; 358/521; 358/1.13; 358/1.9; 358/488; 358/474; 347/233; 347/116; 347/16; 399/20; 399/38; 271/152

(58) Field of Classification Search
USPC ............ 358/498, 474, 521, 1.13, 1.9, 488; 347/233, 116, 16; 271/152; 399/20, 38
See application file for complete search history.

(56) References Cited

U.S. PATENT DOCUMENTS

| | | | |
|---|---|---|---|
| 7,417,652 B2 * | 8/2008 | Yamazaki | 347/116 |
| 7,589,846 B2 | 9/2009 | Yoshida | |
| 7,639,958 B2 * | 12/2009 | Okamoto et al. | 399/38 |
| 8,004,726 B2 * | 8/2011 | Misaka | 358/474 |
| 2006/0001891 A1 | 1/2006 | Yoshida | |
| 2006/0171001 A1 | 8/2006 | Kitagawa et al. | |
| 2007/0059066 A1 * | 3/2007 | Fukatsu et al. | 399/341 |
| 2007/0126851 A1 * | 6/2007 | Yamazaki | 347/233 |
| 2007/0229921 A1 * | 10/2007 | Hozono et al. | 358/498 |
| 2008/0075496 A1 * | 3/2008 | Okamoto et al. | 399/77 |
| 2008/0174834 A1 * | 7/2008 | Ueda et al. | 358/488 |
| 2008/0292334 A1 * | 11/2008 | Takahashi | 399/38 |
| 2009/0310983 A1 * | 12/2009 | Shoji et al. | 399/20 |
| 2010/0066782 A1 * | 3/2010 | Yamamoto et al. | 347/16 |
| 2011/0101600 A1 * | 5/2011 | Chihara et al. | 271/152 |

FOREIGN PATENT DOCUMENTS

| | | |
|---|---|---|
| JP | 2002-229278 | 8/2002 |
| JP | 2004-212894 | 7/2004 |
| JP | 2005-289035 A | 10/2005 |

(Continued)

OTHER PUBLICATIONS

Office Action issued in corresponding Japanese Patent Application No. 2010-008807 dated Aug. 7, 2012.

(Continued)

Primary Examiner — Charlotte M Baker
Assistant Examiner — Rury Grisham
(74) Attorney, Agent, or Firm — Banner & Witcoff, Ltd.

(57) ABSTRACT

Image data is stored in a RAM, and when recording media are fed from a paper feed tray for a time interval longer than a predetermined time interval, a CPU causes an image forming section to execute a correction process.

11 Claims, 7 Drawing Sheets

(56) References Cited

FOREIGN PATENT DOCUMENTS

| | | |
|---|---|---|
| JP | 2006-212894 A | 8/2006 |
| JP | 2007-096614 A | 4/2007 |
| JP | 2007-121907 | 5/2007 |
| JP | 2007-279327 | 10/2007 |
| JP | 2008-083253 | 4/2008 |
| JP | 2008-216658 | 9/2008 |
| JP | 2009-208401 | 9/2009 |

OTHER PUBLICATIONS

Office Action for corresponding Japanese Patent Application No. 2010-008807 mailed Jan. 10, 2012.

* cited by examiner

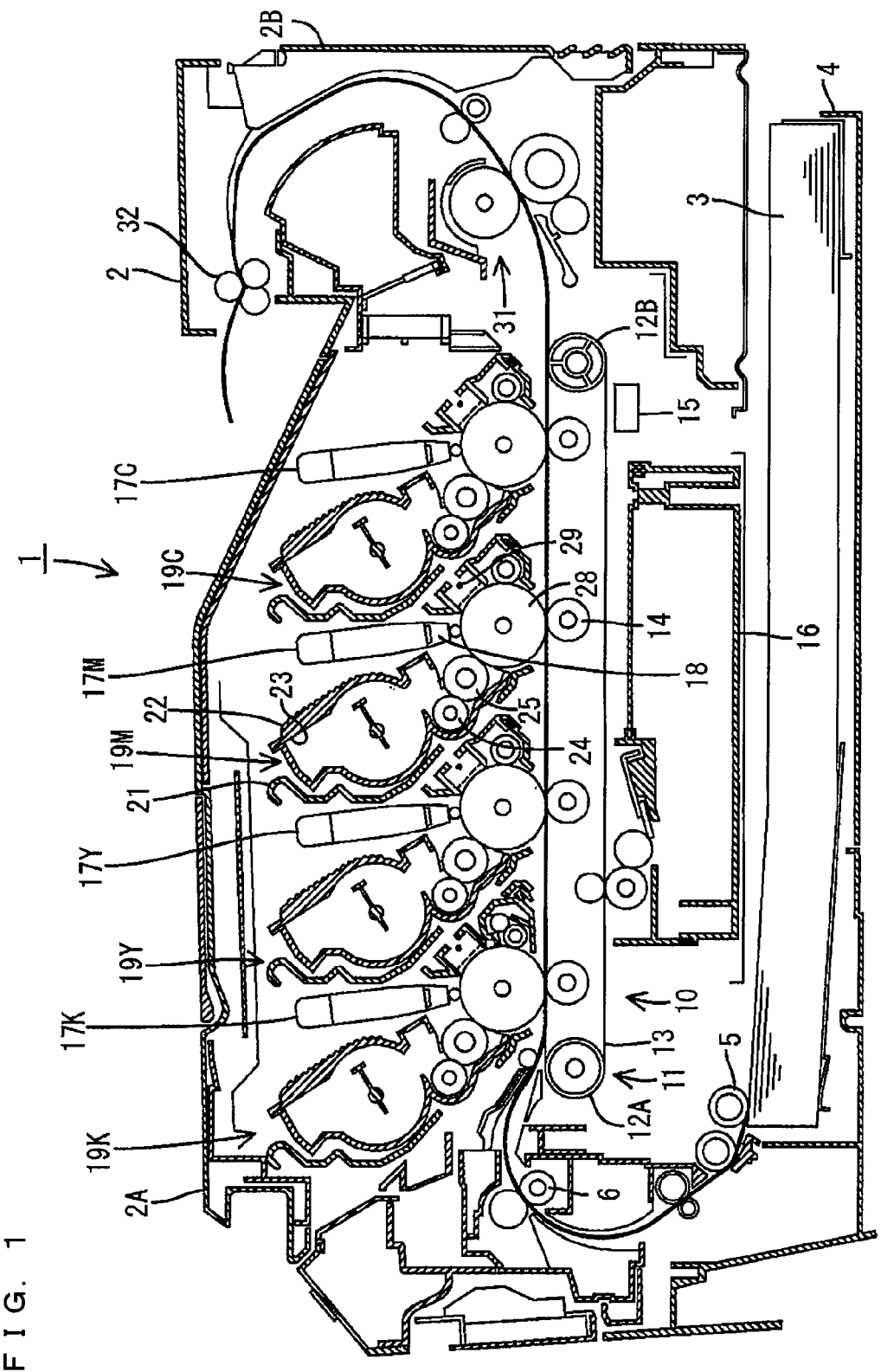
F I G. 1

FIG. 7

| TYPE OF CORRECTION PROCESS | | | EXECUTION TIME (sec) |
|---|---|---|---|
| CONCENTRATION CORRECTION | | | 30 |
| | DEVELOPMENT BIAS CORRECTION | | 20 |
| | GAMMA CORRECTION | | 15 |
| | | C | 5 |
| | | M | 5 |
| | | Y | 5 |
| | | K | 5 |
| MISREGISTRATION CORRECTION | | | 25 |

IMAGE FORMING APPARATUS

CROSS-REFERENCE TO RELATED APPLICATIONS

This non-provisional application claims priority under 35 U.S.C. §119(a) on Patent Application No. 2010-008807 filed in Japan on Jan. 19.2010, the entire contents of which are hereby incorporated by reference.

TECHNICAL FIELD

The present invention relates to an image forming apparatus that can execute processes for improving the results of image formation using an image forming section when image formation is performed on a recording medium.

BACKGROUND

Conventionally, when print jobs are executed continuously in a printer, calibration is executed in the middle of a job or between jobs, interruption of printing due to the execution of the calibration is controlled as much as possible, and the calibration is executed after the jobs are ended, to appropriately prevent the degradation of printing characteristics.

SUMMARY

However, according to the above-mentioned conventional technology, controlled calibration is executed after jobs are ended. Hence, even if there is a time in which the calibration can be executed in the middle of a job or between jobs, printing is waited for, whereby a wasteful time occurs.

In view of the above-mentioned circumstances, an object of the present invention is to provide an image forming apparatus capable of executing a correction process in the case that there occurs a time in which the correction process can be executed in the middle of a job formed of a plurality of pieces of image data or between jobs.

For the purpose of attaining the above-mentioned object, an image forming apparatus according to a first aspect is an image forming apparatus, comprising: an image forming section for forming an image on a recording medium based on image data; a storage section for storing said image data; a feed section for feeding recording media to said image forming section at a time interval; a storage judgment section for judging whether said image data is stored in said storage section; a feed judgment section for judging whether a time interval during which said feed section feeds said recording media is longer than a predetermined time interval; and an execution section for executing a process for improving a result of image formation by said image forming section when said storage judgment section judges that said image data is stored in said storage section and when said feed judgment section judges that said time interval is longer than said predetermined time interval.

According to the first aspect, a correction process is allowed to be executed in a period in which the next recording medium is not fed for a time longer than a predetermined time during image formation. Hence, the wasteful period in which image formation is waited for can be used effectively as a period for the correction process.

The above and further objects and features will more fully be apparent from the following detailed description with accompanying drawings.

BRIEF DESCRIPTION OF THE SEVERAL VIEWS OF THE DRAWINGS

FIG. 1 is a side sectional view showing a general configuration of an image forming apparatus according to an embodiment of the present invention;

FIG. 7 is a table showing the relationship between the type of a correction process and the execution time thereof according to the embodiment of the present invention.

DETAILED DESCRIPTION (Overall Configuration of Printer)

Figure 2:
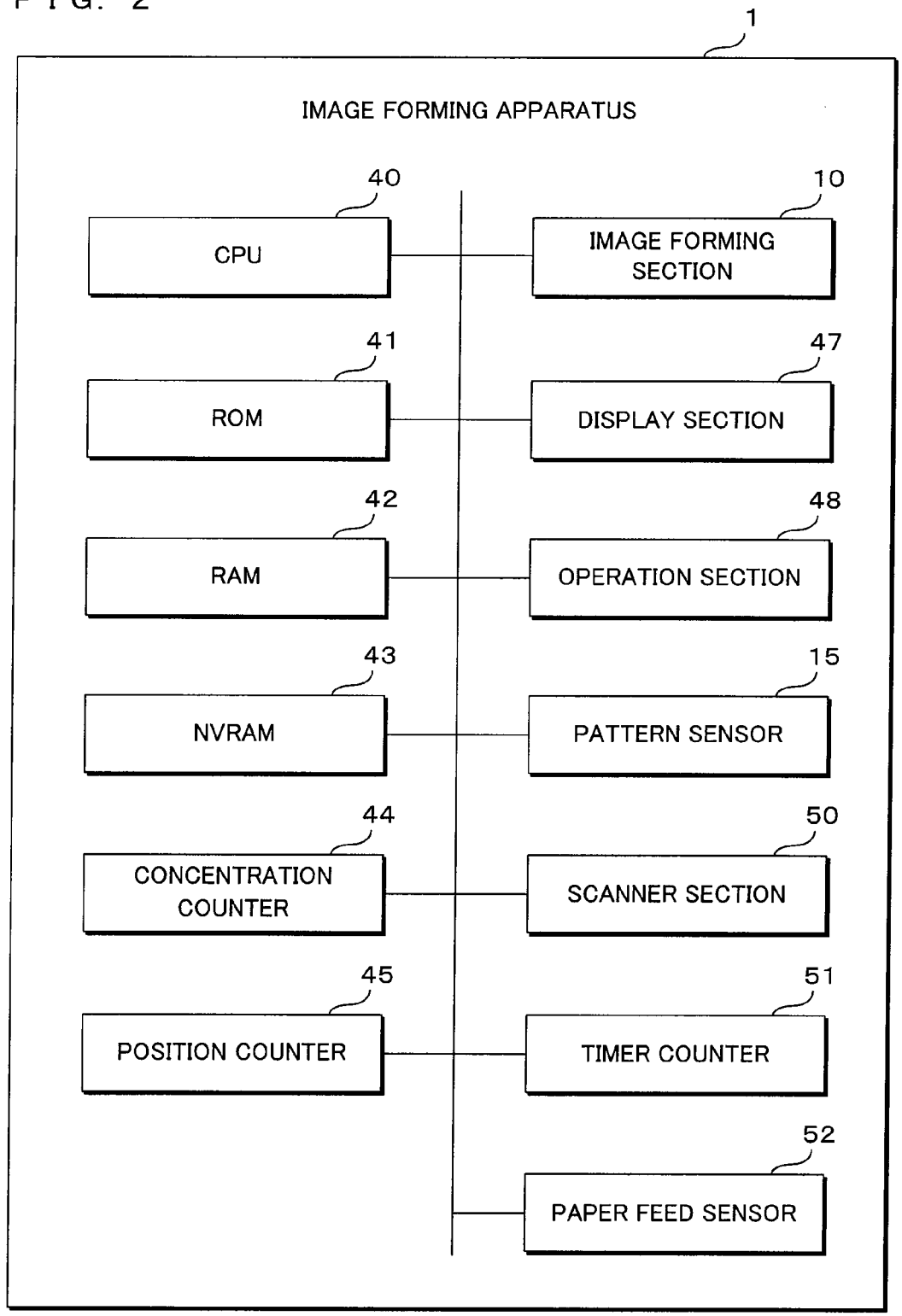
FIG. 2 is a block diagram showing the general configuration of the image forming apparatus according to the embodiment of the present invention.

FIG. 1 is a side sectional view showing a general configuration of a printer 1 (an example of an image forming apparatus according to the present invention) according to an embodiment. The Printer 1 is an Electrophotographic Color Printer. In the following descriptions, the left side of FIG. 1 indicates the front side of the apparatus. Furthermore, in FIG. 1, reference codes representing the same components used among various colors are partly omitted.

The printer 1 is equipped with a body casing 2. An upper cover 2A is provided on the upper face of the body casing 2 and a rear cover 2B is provided on the rear face thereof so that they can be opened and closed. In addition, at the bottom portion of the body casing 2, a paper feed tray 4 (an example of a feed section according to the present invention) on which a plurality of recording media 3 can be housed is mounted so as to be drawable forward.

A paper feed roller 5 (an example of the feed section according to the present invention) is provided above the front end portion of the paper feed dray 4. The recording media 3 housed on the paper feed tray 4 are fed to a registration roller 6 located above by the paper feed roller 5. The registration roller 6 (an example of the feed section according to the present invention) conveys the recording media 3 onto the belt unit 11 of an image forming section 10.

The image forming section 10 (an example of the image forming section and an execution section according to the present invention) is equipped with a belt unit 11, exposure sections 17K, 17Y, 17M and 17C, process sections 19K, 19Y, 19M and 19C, and a fixing unit 31.

The belt unit 11 is formed of a circular belt 13 stretched between front and rear belt support rollers 12A and 12B (as a pair). The recording medium 3 on the belt 13 is conveyed rearward by the belt 13 when the belt 13 is driven. Furthermore, inside the belt 13, transfer rollers 14 are provided at positions opposed to the photosensitive drums 28 of the process sections 19K to 19C described later while the belt 13 is held therebetween.

The exposure sections 17K, 17Y, 17M and 17C are supported on the lower face of the upper cover 2A. An LED head 18 formed of a plurality of LEDs arranged in a row is provided at the lower end portion of each of the exposure sections. Each of the exposure sections 17K to 17C is subjected to light emission control based on image data to be printed, and the light from the LED head 18 scans the surface of the corresponding photosensitive drum 28, line by line.

Left and right pattern sensors 15 (as a pair) being used, for example, to detect a pattern formed on the belt 13 are provided below the belt 13. The pattern sensors 15 apply light to the surface of the belt 13, receive the reflected light thereof using a phototransistor or the like, and output a signal having a level corresponding to the amount of the received light. Furthermore, a cleaner 16 for recovering toner, paper powder, etc. attaching to the surface of the belt 13 is provided below the belt unit 11.

The process sections 19K, 19Y, 19M and 19C are respectively equipped with frames 21 and four developing cartridges 22 respectively corresponding to, for example, four colors (yellow, magenta, cyan and black), the developing cartridges being attachable to and detachable from the frames 21. When the upper cover 2A is opened, the exposure sections 17K to 17C are retracted upward together with the upper cover 2A, and the process sections 19K to 19C are individually made attachable to and detachable from the body casing 2.

Each developing cartridge 22 is equipped with a toner accommodation chamber 23 for accommodating toner of each color, a feed roller 24 and a developing roller 25. In addition, the photosensitive drums 28 and chargers 29 are provided in the lower portion of the frame 21.

The toner released from the toner accommodation chamber 23 is supplied to the developing roller 25 by the rotation of the feed roller 24 and positively charged by friction between the feed roller 24 and the developing roller 25. As the photosensitive drum 28 is rotated, its surface is first positively charged by the charger 29 uniformly and then exposed by the exposure section 17, whereby an electrostatic latent image corresponding to an image to be formed on the recording medium 3 is formed. Next, as the developing roller 25 is rotated, the toner on the developing roller 25 is supplied to the surface of the photosensitive drum 28, and the electrostatic latent image is visualized as a toner image.

While the recording medium 3 on the belt 13 passes through transfer positions between the photosensitive drums 28 and the transfer rollers 14, respectively, the toner images held on the photosensitive drums 28 are superimposed and transferred onto the recording medium 3 sequentially by transfer voltages applied to the transfer rollers 14. The recording medium 3 onto which the toner images are transferred is fed to the fixing unit 31 provided inside the rear portion of the body casing 2, and the toner images are fixed onto the recording medium 3 by heat. The recording medium 3 is then conveyed upward and discharged to the upper face of the body casing 2 by a discharge roller 32.

(Electrical Configuration of Image Forming Apparatus)

The image forming apparatus 1 is an image forming apparatus equipped with functions for copying, image formation, scanning, etc. As shown in FIG. 2, the image forming apparatus 1 has a configuration in which a CPU 40, a ROM 41, a RAM 42, an NVRAM (nonvolatile memory) 43, a concentration counter 44, a position counter 45, the image forming section 10, a display section 47, an operation section 48, the pattern sensors 15, a scanner section 50, a timer counter 51, a paper feed sensor 52, etc. are connected.

Programs for executing various operations of the image forming apparatus, such as correction processes described later, are stored in the ROM 41. The CPU 40 (an example of a storage judgment section, a supply judgment section, a prediction section, a possibility judgment section, a first detection section and a second detection section according to the present invention) controls the respective sections according to the programs read from the ROM 41 while storing the results of the processing of the programs in the RAM 42 (an example of a storage section according to the present invention) or the NVRAM 43.

The image forming section 10 (an example of the image forming section and correction section according to the present invention) forms an image on a paper sheet using a coloring agent (toner or the like) of a plurality of colors.

The concentration counter 44 counts the values of the time elapsed from the execution of the previous concentration correction process, the number of the recording media 3 on which image formation is performed, the temperature and humidity inside the image forming apparatus, etc. Furthermore, the position counter 45 counts the values of the time elapsed from the execution of the previous misregistration correction process, the number of the recording media 3 on which image formation is performed, the temperature and humidity inside the image forming apparatus, etc. The values obtained by the concentration counter 44 are stored as concentration count values in the NVRAM 43, and the values obtained by the position counter 45 are also stored as position count values in the NVRAM 43.

Moreover, the image forming apparatus 1 is equipped with the display section 47 and the operation section 48. The display section 47 is equipped with a display, a lamp, etc. and can display various setting screens, operation states of the image forming apparatus, etc. The operation section 48 is equipped with a plurality of buttons, and the user can input various instructions.

When the correction processes described later are executed, the pattern sensors 15 detect a pattern formed by the image forming section 10. The scanner section 50 obtains image data by reading a document.

The timer counter 51 measures the time elapsed from the timing at which the exposure for forming a registration pattern is started to the timing at which the formed registration pattern is detected by the pattern sensors 15 at the time of the misregistration correction process. The paper feed sensor 52 detects the leading end of the recording medium 3 fed from the paper feed tray 4.

(Correction Process and Correction Process in Delay Period)

The image forming apparatus according to this embodiment can execute a plurality of correction processes, such as the concentration correction process and the misregistration correction process. The concentration correction process and the misregistration correction process will be described later in detail.

Each correction process has different correction execution conditions. The correction execution conditions are herein conditions (judgment values) for judging whether the apparatus is in a state in which the correction process is required to securely obtain favorable image forming results (or in a state in which the execution of the correction process is desirable). Examples of the specific conditions are the time elapsed from the execution of the previous correction process, the number of the recording media 3 on which image formation is performed, the temperature and humidity inside the image forming apparatus, etc. Threshold values are preset for these conditions (judgment values) by manufacturers, etc. or set by the user.

The CPU 40 usually issues a correction request and causes the correction process corresponding to the correction request to be executed. When a plurality of correction execution conditions (judgment values) have reached their respective threshold values, a plurality of correction requests are issued, and the corresponding correction processes are executed sequentially according to the programs, etc. stored in the ROM 41.

According to the embodiment, the number of the recording media 3 on which image formation is performed after the previous concentration correction process was executed is stored as the concentration counter value, and the number of the recording media 3 on which image formation is performed after the previous misregistration correction process was executed is stored as the position counter value. Furthermore, specific threshold values are set for the concentration counter value and the position counter value as the correction execution conditions according to the embodiment. When the concentration counter value and the position counter value obtained after the previous correction processes were executed have reached the corresponding specific threshold values, the correction processes are executed. Moreover, a correction delay period is a period in which the concentration counter value is in the range of a first concentration threshold value or more and less than a second concentration threshold value or the position counter value is in the range of a first position threshold value or more and less than a second position threshold value.

For example, in the case of the concentration correction process, when the concentration counter value is in the range of 800 (a first concentration threshold value) or more and less than 1000 (a second concentration threshold value), a judgment is thus made that the apparatus is in the state in which the execution of the concentration correction process is desirable, and when the recording media 3 are not fed from the paper feed tray 4 at a predetermined time interval (for example, at the time of intermittent printing) although image data is stored in the RAM 42, the concentration correction process is executed.

Furthermore, when the concentration counter value exceeds 800 (the first concentration threshold value) and reaches 1000 (the second concentration threshold value), a judgment is made that the concentration counter value has reached a value at which the concentration correction process for securely obtaining the quality of concentration is required. Hence, even when image data is stored in the RAM 42, image formation is stopped temporarily and the concentration correction process is executed.

On the other hand, in the case of the misregistration correction process, when the position counter value is in the range of 900 (a first position threshold value) or more and less than 1000 (a second position threshold value), a judgment is thus made that the apparatus is in the state in which the execution of the misregistration correction process is desirable, and when the recording media 3 are not fed from the paper feed tray 4 at a predetermined time interval (for example, at the time of intermittent printing) although image data is stored in the RAM 42, the misregistration correction process is executed.

Furthermore, when the position counter value exceeds 900 (the first position threshold value) and reaches 1000 (the second position threshold value), a judgment is made that the position counter value has reached a value at which the misregistration correction process for securely obtaining an appropriate image position is required. Hence, even when image data is stored in the RAM 42, image formation is stopped temporarily and the misregistration correction process is executed.

(Concentration Correction Process)

In the Concentration Correction Process, the Same Method is used for each color to adjust the concentration of toner of each color. A calibration pattern is formed at a predetermined timing on the outer circumferential face of the belt 13 for each of the process sections 19K to 19C. For example, with respect to the first five calibration patterns of the calibration patterns, calibration patterns separated into five steps in the degree of thinning the pixels constituting the image, 0%, 20%, 40%, 60% and 80%, are formed. Furthermore, the formed calibration patterns are read by the pattern sensors 15, and the concentration of each calibration pattern is detected.

The concentration value of each calibration pattern having been read is compared with the concentration reference value beforehand obtained as an optimal concentration value by an experiment or the like and stored as a setting value in the ROM 41 or the like, whereby a development bias table is created (this process is hereafter referred to as a development bias correction process). "Development bias" is a potential difference generated between the developing roller 25 and the photosensitive drum 28 to perform development by attaching toner to the electrostatic latent image formed on the photosensitive drum 28 in an electrophotographic printer. In addition, development bias values (examples of correction values according to the present invention) at which the electrostatic latent image can be developed at predetermined desirable concentration values are stored in the development bias table.

Furthermore, a gamma table that is referred to when image data is converted into a page-description language (PDL) is created based on calibration patterns different from those of the development bias correction process (this process is hereafter referred to as a gamma correction process). "Gamma correction" is a correction used to adjust the concentration values of the colors of image data and those of colors of a recording medium (printed matter) on which image formation is performed. "Toner concentration values" (examples of correction values according to the present invention) required to reproduce the "color concentrations" of image data at the "color concentrations" of printed matter are stored in the gamma table.

The concentration correction process according to the present invention is formed of the development bias correction process and the gamma correction process.

(Misregistration Correction Process)

The misregistration correction process is carried out by reading the registration pattern, for example. The rotation speed of the belt 13 is known beforehand by an experiment or the like. Furthermore, the positions of the process sections 19K to 19C with respect to the position of the belt 13 are also known by an experiment or the like. Hence, for example, the time (position detection time) from the timing at which exposure for forming the registration pattern using the LED head 18 is started to the timing at which the leading end of the registration pattern in the rotation direction of the belt 13 is detected by the pattern sensors 15 is obtained beforehand by an experiment or the like as a position reference time.

Furthermore, the position reference time is stored in the NVRAM 43, and the position detection time is measured by the timer counter 51 at the time of the misregistration correction process, whereby it is possible to perform adjustment based on the difference between the position detection time and the position reference time. Moreover, the position of the registration pattern on the outer circumferential face of the belt 13 can be specified by relating the timing at which the leading end of the registration pattern is detected by the pattern sensors 15 to the position of the belt 13.

Once the positions of the respective registration patterns formed by the process sections 19K to 19C on the belt 13 are specified as described above, it is possible to know the distance differences in the relative pattern formation positions among the process sections 19K to 19C.

Hence, the time differences among the respective process sections 19K to 19C are obtained with reference to the registration pattern for any one of the respective colors, according to the distance differences among the respective process sections 19K to 19C for forming the individual color images of the other colors and based on the rotation speed of the belt 13 known beforehand. Once the time differences are known, the correction process can be executed by shifting the exposure timing of the LED head 18 of each of the process sections 19K to 19C by each of the time differences.

In other words, if the registration pattern formed by one of the process sections 19 is dislocated backward in the conveying direction of the recording medium 3 from the registration pattern used as the reference, the correction process is executed so that exposure is started at the timing earlier by the amount of the time difference obtained by the distance difference of the registration pattern and the rotation speed of the belt 13. If the distance difference is dislocated forward in the conveying direction, the timing of exposure is delayed by the amount of the time difference obtained from the distance difference, whereby the positional adjustments among the respective individual color images can be performed.

(Correction Process)

Figure 3:
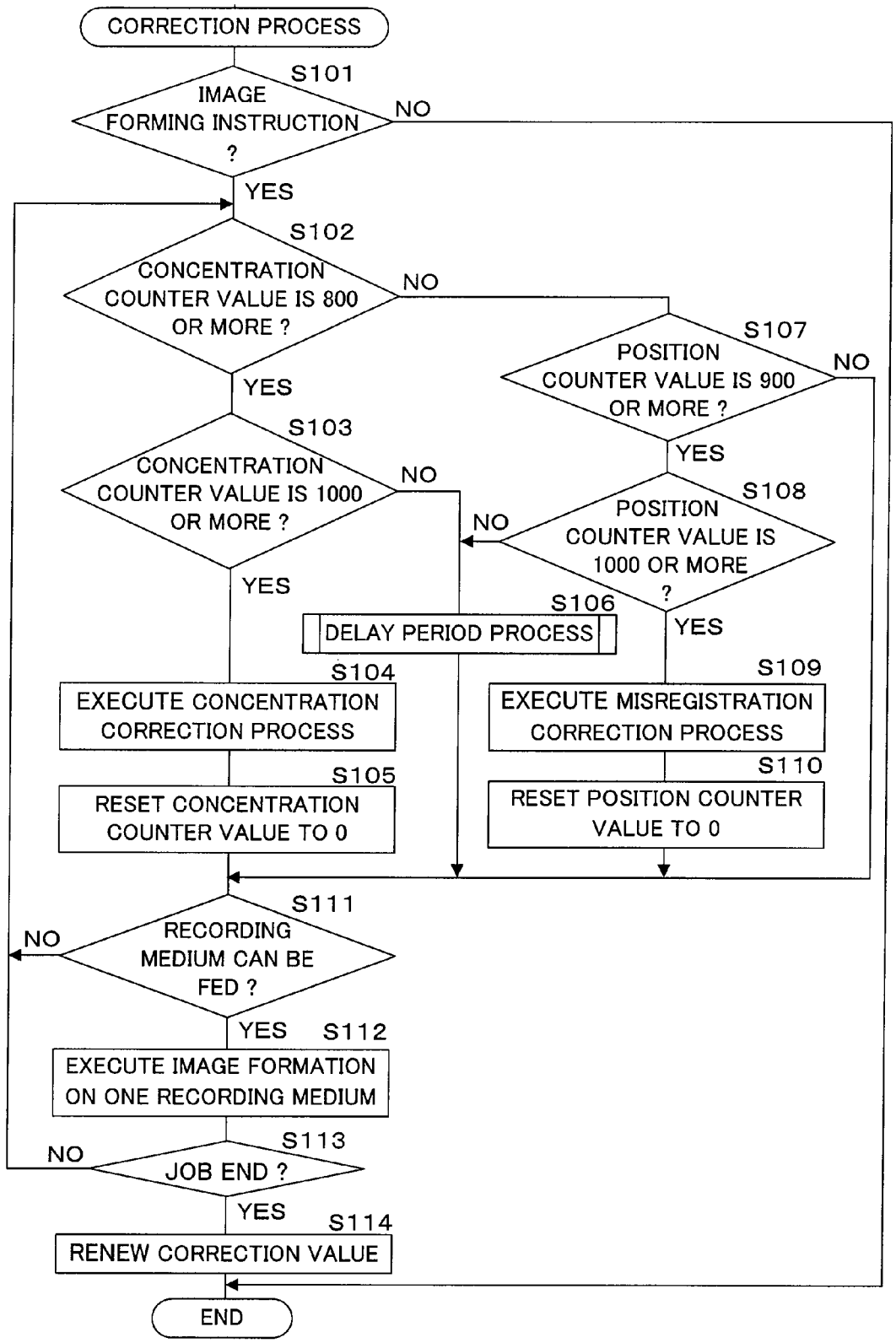
FIG. 3 is a flowchart showing the flow of a correction process according to the embodiment of the present invention.

The Operation of the Image Forming Apparatus 1 will be described below. FIG. 3 is a flowchart showing the flow of the correction process. The correction process is executed periodically by the CPU 40 after the image forming apparatus 1 was started, for example.

When an image forming instruction for a job is issued by remote control operation via a PC (not shown) connected to the printer 1 or by the button operation of the operation section 48, the CPU 40 judges whether image formation has been started by the image forming section 10 (at step S101). The job is data containing a plurality of pieces of image data or a single piece of image data. When the CPU 40 judges that image formation has not been started (NO at step S101), the correction process is ended.

On the other hand, when the CPU 40 judges that image formation has been started (YES at step S101), the CPU 40 judges whether the concentration counter value is 800 (an example of the first threshold value according to the present invention) or more (at step S102). When the concentration counter value is 800 or more (YES at step S102), the CPU 40 judges whether the concentration counter value is 1000 (an example of the second threshold value according to the present invention) or more (at step S103). When the concentration counter value is 1000 or more (YES at step S103), the CPU 40 causes the image forming section 10 to execute the concentration correction process (at step S104). After the end of the concentration correction process, the CPU 40 resets the concentration counter value to 0 (at step S105).

The concentration counter value is stored in the NVRAM 43 formed of a nonvolatile memory and is a value obtained when the concentration counter 44 counts the number of the recording media 3 on which image formation is performed by the image forming section 10. In addition, the value 800 serving as the first concentration threshold value of the concentration counter value is stored in the NVRAM 43 formed of a nonvolatile memory.

The CPU 40 judges whether the concentration counter value is larger/smaller than the first concentration threshold value. If the concentration counter value is larger than the first concentration threshold value, the CPU 40 judges that the concentration counter value has exceeded the first concentration threshold value. On the other hand, if the concentration counter value is smaller than the first concentration threshold value, the CPU 40 judges that the concentration counter value has not exceeded the first concentration threshold value. The value 1000 serving as the second concentration threshold value of the concentration counter value is also stored in the NVRAM 43 formed of a nonvolatile memory as in the case of the first concentration threshold value. The CPU 40 judges the concentration counter value with reference to the second concentration threshold value in a similar way.

For example, if the number of the recording media 3 on which image formation is performed exceeds 1000, the CPU 40 judges that the concentration counter value has reached a value in which it is difficult to maintain the quality of concentration, that is, a value in which image quality is impaired. Furthermore, even when image data is stored in the RAM 42, the CPU 40 causes the image forming section 10 to temporarily stop image formation and executes the concentration correction process.

At step S102, when the concentration counter value is not 800 or more (NO at step S102), the CPU 40 judges whether the position counter value is 900 (an example of the first threshold value according to the present invention) or more (at step S107). When the position counter value is not 900 or more (NO at step S107), the correction process is ended.

When the position counter value is 900 or more (YES at step S107), the CPU 40 judges whether the position counter value is 1000 (an example of the second threshold value according to the present invention) or more (at step S108). When the position counter value is 1000 or more (YES at step S108), the CPU 40 executes the misregistration correction process (at step S109). After the execution of the misregistration correction process, the CPU 40 resets the position counter value to 0 (at step S110).

The position counter value is stored in the NVRAM 43 formed of a nonvolatile memory and is a value obtained when the position counter 45 counts the number of the recording media 3 on which image formation is performed by the image forming section 10. In addition, the value 900 serving as the first position threshold value of the position counter value is stored in the NVRAM 43 formed of a nonvolatile memory.

The CPU 40 judges whether the position counter value is larger/smaller than the first position threshold value. If the position counter value is larger than the first position threshold value, the CPU 40 judges that the position counter value has exceeded the first position threshold value. On the other hand, if the position counter value is smaller than the first position threshold value, the CPU 40 judges that the position counter value has not exceeded the first position threshold value. The value 1000 serving as the second position threshold value of the position counter value is also stored in the NVRAM 43 formed of a nonvolatile memory as in the case of the first position threshold value. The CPU 40 judges the position counter value with reference to the second position threshold value in a similar way.

For example, if the number of the recording media 3 on which image formation is performed exceeds 1000, the CPU 40 judges that the value of the position counter 45 has reached a value in which it is difficult to maintain an appropriate image position. Furthermore, even when image data is stored in the RAM 42, the CPU 40 causes the image forming section 10 to temporarily stop image formation and executes the misregistration correction process.

When the concentration counter value is not 1000 or more (NO at step S103), a delay period process is executed (at step S106). Furthermore, when the position counter value is not 1000 or more (NO at step S108), the delay period process is also executed in a similar way (at step S106).

When the concentration counter value is in the range of 800 or more and less than 1000 (YES at step S102 and NO at step S103) or when position counter value is in the range of 900 or more and less than 1000 (YES at step S107 and NO at step S108), the CPU 40 judges that the counter value has reached a value at which the improvement in the results of image formation is effective (a value at which the improvement in the results of image formation can be expected) by executing the correction process. Hence, there is a possibility that the concentration correction process (at step S304) and the misregistration correction process (at step S312), described later, of the delay period process (at step S106) are executed earlier than the concentration correction process (at step S104) and the misregistration correction process (at step S109). The delay period process (at step S106) will be described later in detail.

After steps S105, S110 and S106, the CPU 40 judges whether the recording medium 3 can be fed from the paper feed tray 4 (at step S111). When the recording medium 3 cannot be fed from the paper feed tray 4 (NO at step S111), the procedure returns to step S102. When the recording medium 3 cannot be fed from the paper feed tray 4 immediately, for example, because of the occurrence of intermittent printing, judgment "NO" is made at the judgment step S111.

When the recording medium 3 can be fed from the paper feed tray 4 (YES at step S111), the image forming section 10 executes image formation on one recording medium 3 (at step S112). Then, the CPU 40 judges whether image formation has been ended for all pieces of image data in a job for which the execution of image formation is instructed (at step S113). When the image formation for all pieces of the image data has been ended (YES at step S113), the CPU 40 renews the development bias table, the gamma table, etc. having already been stored in the NVRAM 43 by using the results of the execution of the concentration correction process (at step S104) and the execution of the misregistration correction process (at step S109), (at step S114). The correction values of the concentration correction process and the correction values of the misregistration correction process have been stored in the NVRAM 43, and the correction values having already been stored are rewritten by new correction values. Hence, inside the job formed of a plurality of pieces of image data, it is possible to prevent unevenness in image quality among the image data.

On the other hand, when image formation for all pieces of the image data has not been ended (NO at step S113), the procedure returns to step S102, and the above-mentioned judgments are repeated.

(Delay Period Process)

The Delay Period Process at Step S106 of FIG. 3 will be described below referring to FIG. 4.

The embodiment is configured such that image data is stored in the RAM 42. When the delay period process shown in FIG. 4 is started, the CPU 40 judges whether image data has been stored in the RAM 42 (at step S201). When no image data is stored in the RAM 42 (NO at step S201), the delay period process is ended.

When image data is stored in the RAM 42 (YES at step S201), the CPU 40 judges whether the recording media 3 have been fed from the paper feed tray 4 at a time interval longer than the predetermined time interval (at step S202). When the recording media 3 have not been fed from the paper feed tray 4 at the time interval longer than the predetermined time interval (NO at step S202), the delay period process is ended.

The time interval is an interval from the time at which one recording medium 3 is fed from the paper feed tray 4 and to the time at which the next recording medium 3 is fed, and is defined as, for example, a spare time occurring between the feeding of one recording medium 3 and the feeding of the next recording medium 3, the recording media 3 being fed continuously. The time interval occurs periodically while image formation is performed on the recording media 3 using a plurality of pieces of image data.

More specifically, the CPU 40 can obtain the time interval at which the recording media 3 are fed by detecting the leading ends of the recording media 3 using the paper feed sensor 52. In this case, the time interval from the time at which the paper feed sensor 52 detected the leading end of a recording medium 3 to the time at which the paper feed sensor 52 detects the leading end of the next recording medium 3 corresponds to the above-mentioned time interval.

The predetermined time interval represents a time interval when the recording media 3 are fed from the paper feed tray 4 at a constant time interval. More specifically, when the spare time from the time at which the paper feed sensor 52 detected the leading end of a recording medium 3 to the time at which the paper feed sensor 52 detects the leading end of the next recording medium 3 is constant at a time interval of 5 seconds, the spare time is the predetermined time interval.

Furthermore, a time interval longer than the predetermined time interval is a time interval that occurs because the recording media 3 are not fed in a time interval longer than the predetermined time interval (5 seconds) although the image formation for image data has not been completed. More specifically, the time interval is a long time interval taking 30 seconds from the time at which the paper feed sensor 52 detected the leading end of a recording medium 3 to the time at which the paper feed sensor 52 detects the leading end of the next recording medium 3. A case in which the interruption of non-periodic paper feed at a time interval longer than the predetermined time interval (5 seconds) occurs during periodic paper feed is taken as an example of the long time interval.

When the recording media 3 are fed from the paper feed tray 4 at the time interval longer than the predetermined time interval (YES at step S202), the image formation is stopped temporarily although image data for which image formation should be performed is available. Next, the CPU 40 judges whether an image formation time at which image formation is performed by the image forming section 10 is predictable (at step S203). When the image formation time is predictable (YES at step S203), the CPU 40 executes a predictability process (at step S204) and ends the delay period process.

A case in which the type of paper is changed from regular paper to thick paper is taken as an example of the case in which the image formation time is predictable. Since regular paper is different from thick paper in the fixing temperature at the fixing unit 31 and in the speed of conveyance of the recording medium 3 using the belt unit 11, etc., it takes time to change the fixing temperature of the fixing unit 31 and the conveyance speed of the belt unit 11, etc.

The temperature difference between the temperature at which fixing is performed for regular paper and the temperature at which fixing is performed for thick paper and the time (temperature change time) required to change the temperature have been stored in the NVRAM 43 beforehand. The temperature change completion time of the fixing unit 31 is obtained by the product of the temperature difference and the temperature change time. Hence, the image formation time is predictable. Furthermore, since the time required for changing the conveyance speed of the belt unit 11, etc. can also be known beforehand by an experiment or the like, the image formation time is predictable. The predictability process (at step S204) will be described later in detail.

At step S203, when the image formation time is not predictable (NO at step S203), the CPU 40 executes a non-predictability process (at step S205) and ends the delay period process. A case in which when the image forming section 10 is forming an image on one recording medium 3, the loading of the image data cannot be completed in time and the next recording medium 3 cannot be fed from the paper feed tray 4 is taken as an example of the case in which the image formation time is not predictable.

In this case, it is impossible to judge whether the loading of the image data takes time because the size of the image data is large or the loading of the image data takes time because the memory is full. It is thus difficult to predict the time at which the loading of the image data is completed.

A case in which at the time of copying, the speed of reading the image data from the recording medium 3 using the scanner section 50 is different from the speed of performing image formation on the recording medium 3 based on the read image data using the image forming section 10 is taken as another of the case in which the image formation time is not predictable. The non-predictability process (at step S205) will be described later in detail.

(Predictability Process)

The Predictability Process at Step S204 of FIG. 4 will be described below referring to FIG. 5.

Figure 5:
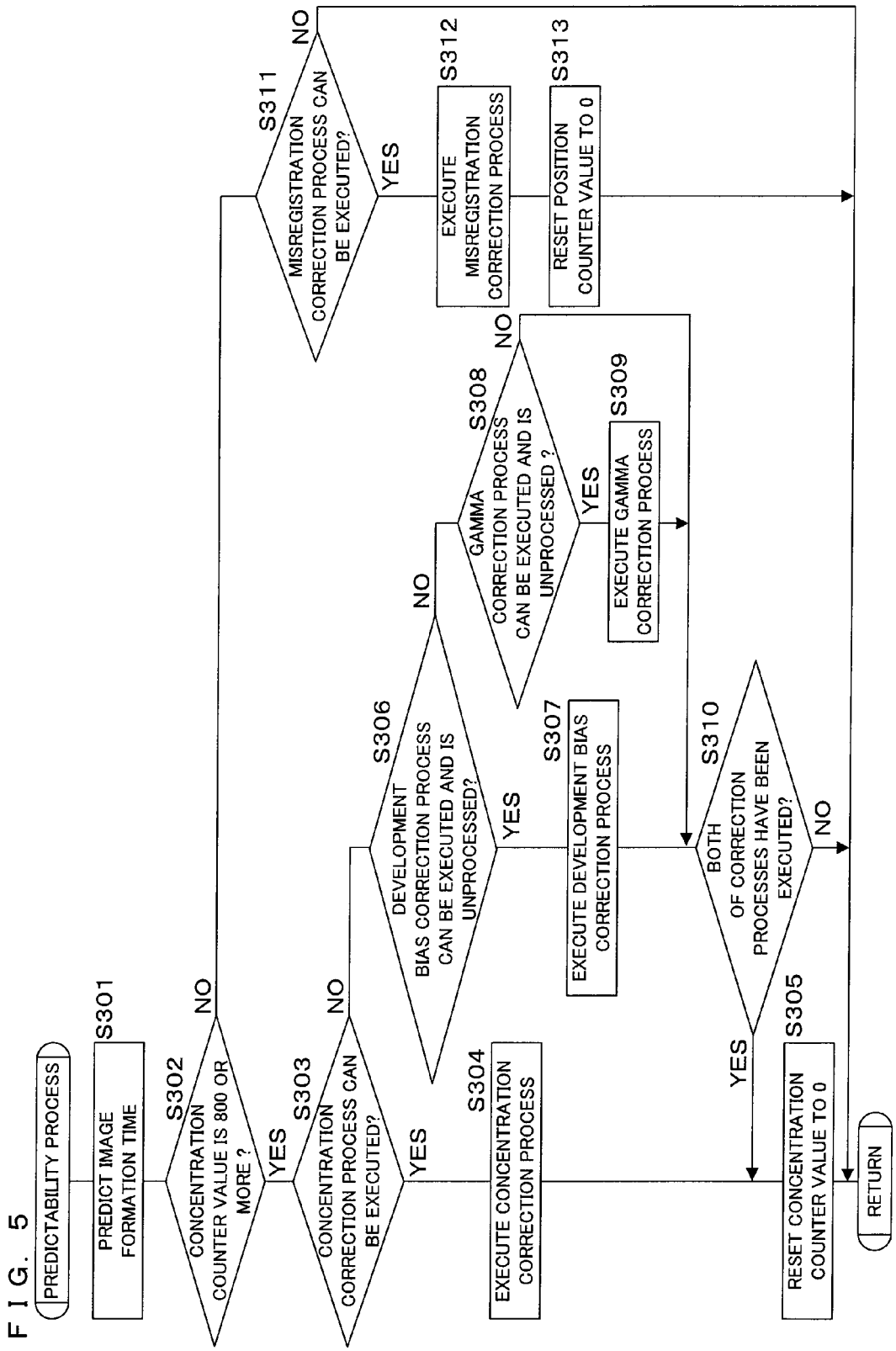
FIG. 5 is a flowchart showing the flow of a predictability process according to the embodiment of the present invention.

When the predictability process shown in FIG. 5 is started, the CPU 40 predicts the image formation time (at step S301). The image formation time corresponds to the time at which the next recording medium 3 is fed after the preceding recording medium 3 was fed.

Next, the CPU 40 judges whether the concentration counter value is 800 or more (at step S302). When the concentration counter value is 800 or more (YES at step S302), the CPU 40 judges whether the concentration correction process can be executed before the image formation time (at step S303). When the concentration correction process can be executed before the image formation time (YES at step S303), the CPU 40 executes the concentration correction process (at step S304), resets the concentration counter value to 0 (at step S305) and ends the predictability process.

In the judgment at step S303, for example, a table in which the type of a correction process and the execution time thereof, as shown in FIG. 7, can be referred to is stored in the NVRAM 43 beforehand, and a wait time is obtained from the difference between the predicted image formation time (at step S301) and the current time, and the wait time is compared with the execution time determined depending on the type of the correction process, whereby the CPU 40 judges whether the execution time determined depending on the type of the correction process can be completed before the image formation time. More specifically, if the wait time is 30 seconds (the execution time of the concentration correction process) or more, the CPU 40 judges that the concentration correction process can be executed before the image formation time. If the wait time is less than 30 seconds, the CPU 40 judges that the concentration correction process cannot be executed before the image formation time.

Furthermore, at step S302, when the concentration counter value is not 800 or more (NO at step S302), the CPU 40 judges whether the misregistration correction process can be executed before the image formation time (at step S311). When the CPU 40 judges that the misregistration correction process can be executed before the image formation time (YES at step S311), the CPU 40 executes the misregistration correction process (at step S312), resets the position counter value to 0 after the execution of the misregistration correction process (at step S313) and ends the predictability process. On the other hand, when the CPU 40 judges that the misregistration correction process cannot be executed before the image formation time (NO at step S311), the CPU 40 ends the predictability process.

In the judgment at step S311, more specifically, if the wait time is 25 seconds (the execution time of the misregistration correction process) or more, the CPU 40 judges that the misregistration correction process can be executed before the image formation time. If the wait time is less than 25 seconds, the CPU 40 judges that the misregistration correction process cannot be executed before the image formation time.

When the CPU 40 judges that the misregistration correction process cannot be executed before the image formation time (NO at step S311), the CPU 40 ends the predictability process without changing the position counter value. The misregistration correction process is not executed until the same judgment is made again at step S311 such that the CPU 40 judges that the misregistration correction process can be executed before the image formation time (YES at step S311) or until the position counter value becomes 1000.

Furthermore, at step S303, when the concentration correction process cannot be executed before the image formation time (NO at step S303), the CPU 40 judges whether the development bias correction process can be executed before the image formation time and further judges whether the development bias correction process is unprocessed (at step S306). When the development bias correction process can be executed before the image formation time and that the development bias correction process is unprocessed (YES at step S306), the development bias correction process is executed (at step S307).

In the judgment at step S306, more specifically, if the wait time is 20 seconds (the execution time of the development bias correction process) or more, the CPU 40 judges that the development bias correction process can be executed before the image formation time. If the wait time is less than 20 seconds, the CPU 40 judges that the development bias correction process cannot be executed before the image formation time.

On the other hand, when the development bias correction process cannot be executed before the image formation time or the development bias correction process has already been executed (NO at step S306), the CPU 40 judges whether the gamma correction process can be executed before the image formation time and further judges whether the gamma correction process is unprocessed (at step S308).

When the gamma correction process can be executed before the image formation time and that the gamma correction process is unprocessed (YES at step S308), the gamma correction process is executed (at step S309). When the gamma correction process cannot be executed before the image formation time or the gamma correction process has already been executed (NO at step S308), the gamma correction process is not executed.

In the judgment at step S308, more specifically, if the wait time is 15 seconds (the execution time of the gamma correction process) or more, the CPU 40 judges that the gamma correction process can be executed before the image formation time. If the wait time is less than 15 seconds, the CPU 40 judges that the gamma correction process cannot be executed before the image formation time.

When the gamma correction process cannot be executed before the image formation time or the gamma correction process has already been executed (NO at step S308), the CPU 40 judges whether both the development bias correction process and the gamma correction process have been executed (at step S310) after the steps S307 and S309. When both the development bias correction process and the gamma correction process have been executed (YES at step S310), the CPU 40 resets the concentration counter value to 0 (at step S305) and ends the non-predictability process. When either the development bias correction process or the gamma correction process has been executed (NO at step S310), the CPU 40 ends the predictability process without changing the concentration counter value.

When both the development bias correction process and the gamma correction process have been completed as described above, the concentration correction process is completed. The reason for this is that, for example, if the gamma correction process is not executed although the development bias correction process has been executed, an appropriate gamma table is not referred to and the image data on the PC is not converted into PDL, whereby deterioration in image quality is caused. Furthermore, when the development bias correction process is executed before the gamma correction process, the amount of toner to be transferred is adjusted properly, and the accuracy of the gamma correction process is enhanced.

On the other hand, if the development bias correction process is not executed although the gamma correction process has been executed, the adjustment of concentration by changing the amount of toner to be transferred is not performed, whereby deterioration in image quality is caused.

(Non-predictability Process)

The Non-Predictability Process at Step S205 of FIG. 4 will be described below referring to FIG. 6.

Figure 6:
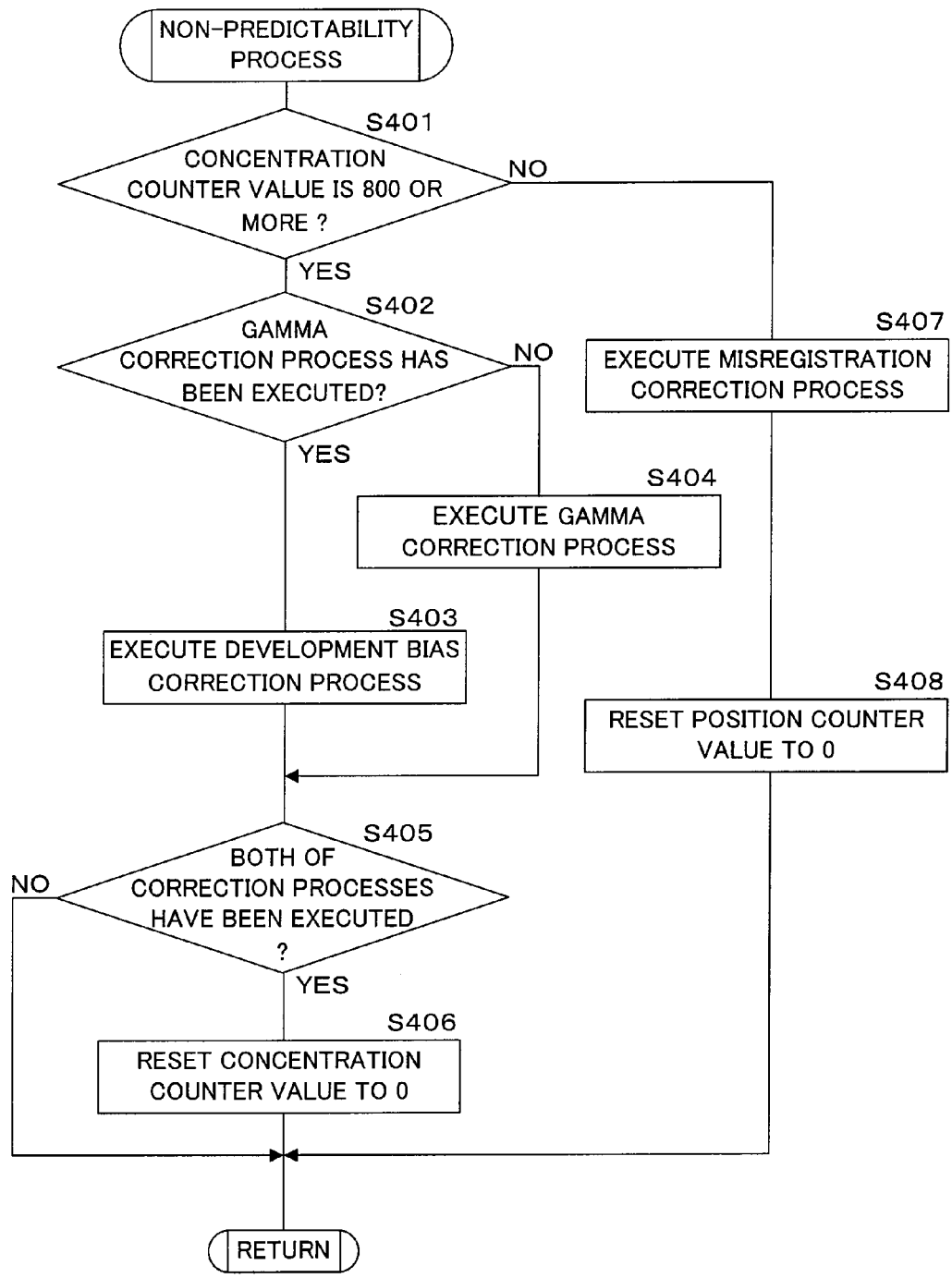
FIG. 6 is a flowchart showing the flow of a non-predictability process according to the embodiment of the present invention.

When the non-predictability process shown in FIG. 6 is started, the CPU 40 first judges whether the concentration counter value is 800 or more (at step S401). When the concentration counter value is 800 or more (YES at step S401), the CPU 40 judges whether the gamma correction process has been executed (at step S402). When the gamma correction process has been executed (YES at step S402), the development bias correction process is executed (at step S403).

On the other hand, when the gamma correction process has not been executed (NO at step S402), the gamma correction process is executed (at step S404). Hence, even when the image formation time cannot be predicted, the gamma correction process (see FIG. 7) whose execution period is shorter than that of the development bias correction process is preferentially executed, whereby favorable image formation results can be obtained, and the completion of the image formation is prevented from being delayed.

The CPU 40 judges whether both the development bias correction process and the gamma correction process have been executed (at step S405) after the steps S303 and S304. When both the development bias correction process and the gamma correction process have been executed (YES at step S405), the CPU 40 resets the concentration counter value to 0 (at step S406) and ends the non-predictability process. When either the development bias correction process or the gamma correction process has been executed (NO at step S405), the CPU 40 ends the non-predictability process without changing the concentration counter value. Hence, when either the development bias correction process or the gamma correction process has been executed, it is possible to avoid a situation in which the other correction process is not executed until the concentration counter value becomes 800 (the first concentration threshold value) or more at the next time.

On the other hand, at step S401, when the concentration counter value is not 800 or more (NO at step S401), the CPU 40 executes the misregistration correction process (at step S407), resets the position counter value to 0 after the end of the misregistration correction process (at step S408) and ends the non-predictability process.

(Effects of the Embodiment)

In the image forming apparatus 1 in which the correction process is executed, the correction process is allowed to be executed in a wait time in which the next recording medium 3 is not fed from the paper feed tray 4 at the predetermined time interval during image formation, whereby the wasteful wait time in which the image forming section 10 waits can be effectively utilized as a correction process time.

Furthermore, in the case that the service life of the developing cartridge 22 has been determined, for example, depending on the rotation speed of the developing roller 25, by executing the correction process in the wait time, the rotation speed of the developing roller 25 is lowered by reducing the number of operations of the so-called idling process or the like in which the operation of the image forming section 10 including the developing roller 25 is tested by rotating the developing roller 25 without using toner, whereby the service life of the developing cartridge 22 can be extended. Hence, it is possible to avoid a situation in which image formation cannot be performed on the recording medium due to the service life of the developing cartridge 22 although toner is accommodated in the toner accommodation chamber 23. As a result, it is possible to reduce the amount of toner to be wasted.

Furthermore, when the CPU 40 can predict the image formation time during image formation, the CPU 40 can execute the correction process within the wait time of the image forming section 10. It is thus possible to prevent a situation in which the correction process is executed for a time longer than the wait time of the image forming section 10 and the completion of the image formation is delayed.

Moreover, even when the CPU 40 cannot predict the image formation time during image formation, if the correction process is not executed, image quality is degraded, and favorable image formation results cannot be obtained. On the other hand, if the correction process is executed when the CPU 40 cannot predict the image formation time during image formation, in the case that the execution time of the correction process is long for example, there is a possibility that the correction process is executed for a time longer than the wait time and the completion of the image formation is delayed. Hence, the CPU 40 causes the correction process that can be executed in a short time to be executed preferentially, whereby favorable images can be obtained and the completion of the image formation can be prevented from being delayed.

Besides, the CPU 40 causes the concentration correction process to be executed for the respective division units of the development bias correction process and the gamma correction process, for example, whereby the execution time of the concentration correction process can be shortened. Hence, it is possible to prevent a situation in which the correction process is executed at a time interval longer than the predetermined time interval and the completion of the image formation is delayed.

Additionally, when the CPU 40 judges that a correction execution condition (a judgment value for judging the necessity of the correction process) has reached the first threshold value thereof, the image forming section 10 executes the correction process, whereby the image forming section 10 can execute the correction process properly at the timing in which the correction process is necessary.

Still further, when the CPU 40 judges that the correction execution condition has reached the second threshold value thereof, the CPU 40 executes the correction process regardless of the judgment of the paper feed sensor 52. Hence, the correction process can be executed at the timing in which the correction process is essentially necessary, regardless of the wait time during image formation.

For example, the second threshold value is set so as to be larger than the first threshold value and when the concentration counter value and/or the position counter value are larger than the first threshold value thereof and smaller than the second threshold value thereof, it is possible to set a period (correction delay period) during which the execution of the correction process that can be executed properly at a proper timing in which the correction process is necessary is suspended. When the concentration counter value and/or the position counter value are larger than the second threshold value thereof, the correction process is executed forcibly. Hence, the correction process can be executed stepwise.

Furthermore, since the concentration correction process is executed more preferentially than the misregistration correction process, the quality of concentration is improved, and the pattern sensors 15 can easily detect misregistration at the time of the misregistration correction process. Hence, it is possible to avoid a situation in which misregistration detection is repeated many times, whereby the time for the correction process can be shortened.

If the correction values created by the correction process that was executed in the middle of image formation on the recording media 3 are renewed immediately, there is a possibility that images being uneven in image quality may be formed among the image data of the same job formed of a plurality of pieces of image data stored in the RAM 42, and the appearance of the images formed on the recording media becomes bad. Hence, the correction values created by executing the correction process are renewed after image formation was executed based on the image data of the last page of the same job, whereby it is possible to prevent unevenness in image quality in the same job.

(Other Embodiments)

(1) In the block diagram of FIG. 2, the image data and the setting values set by the user are not limited to be stored in the RAM 42 or the NVRAM 43, but may be stored in a recording medium, such as a hard disk.

(2) The embodiment is configured such that a calibration pattern or a registration pattern is formed on the outer circumferential face of the belt 13 for each of the process sections 19K to 19C at a predetermined timing. However, the embodiment may also be configured such that a calibration pattern or a registration pattern is formed on the photosensitive drum 28.

(3) The gamma correction process shown in FIG. 6 or FIG. 7 may be executed so as to be divided further for each color. For example, in an image forming apparatus having a four-color copying function, the gamma correction process can be executed for each of cyan (C), magenta (M), yellow (Y) and black (K). In comparison with a gamma correction process that is executed for four colors together, in the gamma correction process that is executed for each color, the number of patterns formed by the image forming section 10 is reduced, and the number of patterns detected by the pattern sensors 15 is also reduced, whereby the time for the correction process can be shortened.

Figure 4:
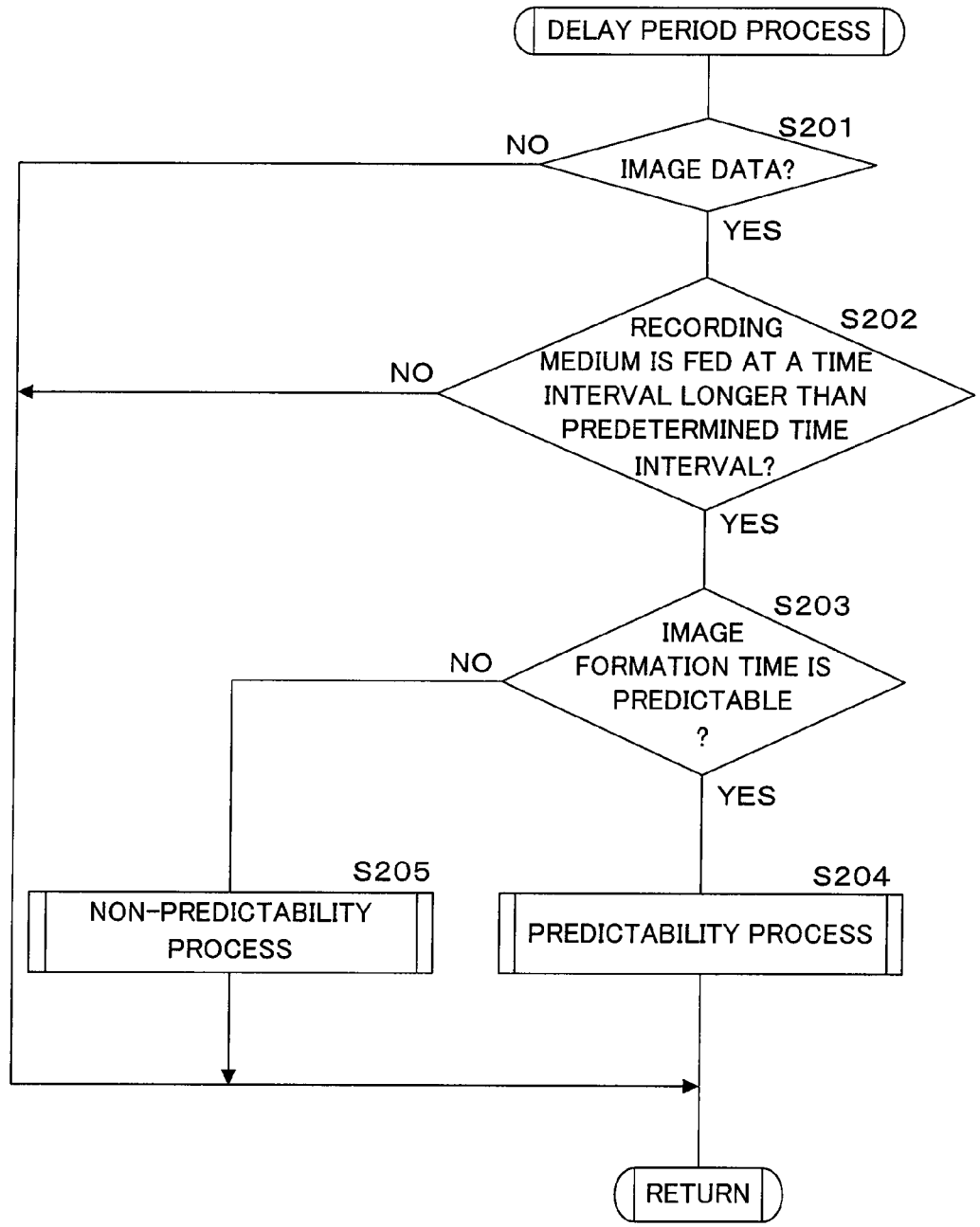
FIG. 4 is a flowchart showing the flow of a delay period process according to the embodiment of the present invention.

(4) Two types of correction processes, that is, a misregistration correction process in the main scanning direction and a misregistration correction process in the sub-scanning direction, are available as the misregistration correction process shown in FIGS. 4 to 6, and the two types of the correction processes are executed simultaneously in many cases. However, the misregistration correction process in the main scanning direction and the misregistration correction process in the sub-scanning direction may be executed separately.

(5) In the embodiment, the execution order of the development bias correction process and the gamma correction process is not determined. However, the development bias correction process may be executed before the gamma correction process. In this case, the amount of toner to be transferred is adjusted properly, and the accuracy of the gamma correction process can be enhanced.

For example, a judgment process for judging whether the development bias correction process has been executed is newly added between step S306 and step S308 in FIG. 5. When the development bias correction process has been executed, the procedure advances to step S308, and when the development bias correction process has not been executed, the procedure advances to step S310.

(6) In the embodiment, when the concentration counter value exceeds the first concentration threshold value or the position counter value exceeds the first position threshold value and intermittent printing occurs, the concentration correction process or the misregistration correction process is executed. However, upon the occurrence of the intermittent printing, the concentration correction process or the misregistration correction process may be executed forcibly. For example, the correction process shown in FIG. 3 is not executed, but the delay period process shown in FIG. 4 is executed during image formation.

(7) In the embodiment, the correction process is executed when the time interval from the time at which one recording medium 3 is fed and to the time at which the next recording medium 3 is fed is not less than the predetermined time interval. However, the correction process may be executed when the time interval between jobs formed of image data is not less than the predetermined time interval.

For example, in FIG. 4, a judgment is made as to whether a plurality of jobs are available, and when a plurality of jobs are available, a judgment is made as to whether the jobs are executed at the predetermined time interval or more. When it is judged that the jobs are executed at the predetermined time interval or more, a judgment is made as to whether the image formation time at which the next image formation is performed by the image forming section 10 is predictable (at step S203). When the image formation time is predictable (YES at step S203), the predictability process is executed (at step S204), and the delay period process is ended.

(8) In the embodiment, in FIG. 4, a judgment is made as to whether the image formation time is predictable (at step S203). However, the correction process may be executed without predicting the image formation time. More specifically, after judgment "YES" at step S202, the step S203 is omitted, and the non-predictability process shown in FIG. 6 is executed.

(9) In the embodiment, when the concentration counter value or the position counter value has reached 1000, image formation is temporarily stopped even when image data is stored in the RAM 42, and the concentration correction process or the misregistration correction process is executed. However, the concentration correction process or the misregistration correction process may be executed after image formation is performed for all pieces of image data, among the image data stored in the RAM 42, for which the execution of image formation is instructed.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image forming apparatus, comprising:
an image forming section configured to form an image on a recording medium based on image data;
a storage configured to store said image data;
a feed section configured to feed recording media to said image forming section at a time interval;
a storage judgment section configured to judge whether said image data is stored in said storage section;
a feed judgment section configured to judge whether a time interval during which said feed section feeds said recording media is longer than a predetermined time interval;
a prediction section configured to predict a wait time until said feed section feeds a next recording medium when said feed judgment section judges that said time interval is longer than said predetermined time interval;
a possibility judgment section configured to judge whether a process for improving a result of image formation by said image forming section can be executed within the wait time predicted by said prediction section; and
an execution section for executing the process for improving the result of image formation by said image forming section when said storage judgment section judges that said image data is stored in said storage section and when said possibility judgment section judges that said process can be executed within the predicted wait time.

2. The image forming apparatus according to claim 1, wherein
said execution section is configured to execute a plurality of processes for improving a result of image formation that are executed in mutually different times, and
when said prediction section cannot predict the wait time of said feed section, said execution section executes a process that is executed in a shorter time in preference to a process that is executed in a longer time.

3. The image forming apparatus according to claim 1, wherein
said execution section is further configured to divide a first correction process corresponding to said process for improving the result of image formation into a plurality of division units and to execute a second correction process for each division unit.

4. The image forming apparatus according to claim 1, further comprising a first detection section configured to detect that a judgment value for judging the necessity of said process to be executed by said execution section has reached a first threshold value,
wherein said execution section is configured to execute said process in a state in which said first detection section has detected that said judgment value has reached the first threshold value and when said feed judgment section judges that said time interval is longer than said predetermined time interval.

5. The image forming apparatus according to claim 4, further comprising a second detection section configured to detect that a judgment value for judging the necessity of said process to be executed by said execution section has reached a second threshold value,
wherein said execution section executes said process when said second detection section detects that said judgment value has reached the second threshold value, regardless of the judgment of said feed judgment section.

6. The image forming apparatus according to claim 1, wherein said execution section is configured to:
execute, as said process, a concentration correction process for adjusting an image concentration at a time of image formation by said image forming section and a misregistration correction process for adjusting an image forming position at a time of image formation by said image forming section, and
execute said concentration correction process in preference to said misregistration correction process.

7. The image forming apparatus according to claim 6, wherein said concentration correction process includes a development bias correction process and a gamma correction process.

8. The image forming apparatus according to claim 7, wherein said execution section executes said development bias correction process in preference to said gamma correction process.

9. The image forming apparatus according to claim 1, wherein after said process is executed by said execution section and when said image forming section has executed image formation based on a last image data of a job formed of a plurality of pieces of image data stored in said storage section, a value created when said execution section executed said process is renewed.

10. An image forming apparatus, comprising:
an image forming section configured to form an image on a recording medium based on image data;
a storage section configured to store said image data;
a feed section configured to feed recording media to said image forming section at a time interval;
a processor; and
memory storing instructions that, when executed, cause the image forming apparatus to:
judge whether said image data is stored in said storage section;
judge whether a time interval during which said feed section feeds said recording media is longer than a predetermined time interval;
predict a wait time until said feed section feeds a next recording medium when said time interval is determined to be longer than said predetermined time interval;
judge whether a process for improving a result of image formation by said image forming section can be executed within the predicted wait time; and
execute the process for improving the result of image formation by said image forming section when said image data is determined to be stored in said storage section and upon determining that said process can be executed within the predicted wait time.

11. An image forming apparatus, comprising:
an image forming section configured to form an image on a recording medium based on image data;
a storage section configured to store said image data;
a feed section configured to feed recording media to said image forming section at a time interval;
a processor; and
memory storing instructions that, when executed, cause the image forming apparatus to:
judge whether said image data is stored in said storage section;
judge whether a time interval during which said feed section feeds said recording media is longer than a predetermined time interval; and execute a process for improving a result of image formation by said image forming section when said image data is determined to be stored in said storage section and upon determining that said time interval is longer than said predetermined time interval, wherein executing the process includes:

executing, as said process, a concentration correction process for adjusting an image concentration at a time of image formation by said image forming section and a misregistration correction process for adjusting an image forming position at a time of image formation by said image forming section, wherein said concentration correction process is executed in preference to said misregistration correction process.

* * * * *